United States Patent
Yoshinori et al.

(10) Patent No.: US 6,491,577 B2
(45) Date of Patent: Dec. 10, 2002

(54) AIR CONDITIONING SYSTEM FOR VEHICLE AND METHOD FOR CONTROLLING SAME

(75) Inventors: Takeshi Yoshinori, Okazaki (JP); Shinji Aoki, Chiryu (JP); Yuichi Kajino, Nagoya (JP); Kouji Sakai, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/916,694

(22) Filed: Jul. 27, 2001

(65) Prior Publication Data

US 2002/0019213 A1 Feb. 14, 2002

(30) Foreign Application Priority Data

Aug. 4, 2000 (JP) ........................................ 2000-237343

(51) Int. Cl.$^7$ ................................................. B60H 1/26
(52) U.S. Cl. ............................ 454/75; 165/202; 236/51
(58) Field of Search ............................ 454/75; 236/51; 165/202

(56) References Cited

FOREIGN PATENT DOCUMENTS

| EP | 0 419 722 | * | 9/1989 |
| JP | A-5-229332 | | 9/1993 |
| JP | A-10-86628 | | 4/1998 |
| JP | 11-189023 | * | 7/1999 |
| JP | 2000-177376 | * | 6/2000 |

* cited by examiner

*Primary Examiner*—Harold Joyce
(74) *Attorney, Agent, or Firm*—Harness, Dickey & Pierce, PLC (57) ABSTRACT

A sitting position of a vehicle occupant in the longitudinal direction of a vehicle is detected, an outlet close to the sitting position of the occupant from plural outlets and is selected based on the detected sitting position, and air is blown out from the selected outlet toward the occupant's sitting position. Thus, since an outlet close to the occupant's sitting position is selected, it becomes easier for air to reach the vehicle occupant to sufficiently cool or warm the occupant with a small amount of blown out air.

9 Claims, 4 Drawing Sheets

AIR CONDITIONING SYSTEM FOR VEHICLE AND METHOD FOR CONTROLLING SAME

FIELD OF THE INVENTION

The present invention relates to an air conditioning system for a vehicle, and more particularly to an air conditioning system for a vehicle having at least three rows of seats in the longitudinal direction of the vehicle.

DESCRIPTION OF THE RELATED ART

Heretofore there has been an RV (recreational vehicle) having three rows of seats (front, middle and rear seats) in the longitudinal direction of the vehicle in which a cooling outlet and a heating outlet are provided for each of the front, middle and rear seats to ensure satisfactory air conditioning for all of occupants on those seats.

In such an RV, however, seat slide ranges (position adjusting ranges) in the vehicular longitudinal direction of the middle and rear seats are wide, so for example when the middle seat is moved largely to the rear seat side, the distance between the air outlet for the middle seat and the sitting position of the middle seat occupant increases remarkably, so that it becomes difficult for the blown out air to reach the middle seat occupant.

In JP-A No. H10-86628 there is disclosed an air conditioning system wherein the position of a front seat in the longitudinal direction of a vehicle is detected and the volume of air blown out to the front seat occupant is adjusted in accordance with the distance between an outlet for the front seat and the front seat.

Where it is difficult for the blown out air to reach any of the three rows of seats in the foregoing vehicle, if the volume of air is adjusted and increased as in the aforesaid publication, it is possible to solve the described problem. However, the air which has been diffused to another occupant as a result of the increase in air volume creates a draft, thus making another occupant uncomfortable. If the air volume is increased merely to solve the deteriorated cooling or heating, an air conditioning having a large capacity is required, causing an increase in the load of a refrigerant compressor during cooling, with consequent increase in the driving force of the refrigerant compressor.

In an air conditioning system in which engine cooling water is used as a heat source for heating air with an increase in efficiency of a vehicle engine, the heat source during heating becomes insufficient as the volume of blown out air increases, thus giving rise to the problem that the temperature of blown out air drops.

SUMMARY OF THE INVENTION

The present invention has been accomplished in view of the above-mentioned drawbacks and it is therefore an object of the invention to provide an air conditioning system for a vehicle having at least three rows of seats in the longitudinal direction of the vehicle, which can ensure cooling and warming of vehicle occupants while suppressing an increase in air volume no matter in what vehicular longitudinal positions the occupants may sit.

For achieving the above-mentioned object, in a first aspect of the present invention there is provided a method for controlling an air conditioning system for a vehicle having three or more rows of seats in the longitudinal direction of the vehicle, the seats being adjustable in their vehicular longitudinal positions, the air conditioning system being mounted on the vehicle and having plural air blow out outlets in the vehicular longitudinal direction, which method comprises detecting a sitting position of a vehicular occupant in the vehicular longitudinal direction, selecting an outlet located near the occupant's sitting position out of the plural outlets based on the detected sitting position, and blowing out air from the selected outlet toward the occupant's sitting position.

Thus, since the outlet located near the occupant's sitting position is selected and air is blown out from the selected outlet, it is easier for blown out air to reach the occupant. Specifically, with a small volume of blown out air, the occupant is sufficiently cooled or warmed. Also, since the volume of air blown out toward the occupant can be reduced, there is no fear of draft air flowing toward another occupant of the vehicle.

Moreover, since the blown out air volume for a vehicular occupant can be diminished, in an air conditioning system provided with a refrigerant compressor, it is possible to decrease the load on the refrigerant compressor during cooling, and thereby decreasing the driving force of the refrigerant compressor.

Further, since the blown out air volume for a vehicular occupant can be diminished, in an air conditioning system wherein engine cooling water is utilized as a heat source for heating blast air, it is possible to prevent a lowering in temperature of blown out air during heating and hence sufficiently warming the occupant.

In a second aspect of the present invention there is provided, in combination with the above first aspect, a vehicular air conditioning system controlling method wherein the temperature or volume of the air blown out from the outlets is controlled according to the sitting position of the vehicle occupant.

According to this method, for example during cooling, by reducing the temperature of blown out air with an increase in the distance between the vehicle occupant and the associated outlet, a sufficient cool feeling can be given to the occupant with a reduced volume of blown out air.

In a third aspect of the present invention there is provided, in combination with the above first or second aspect, a vehicular air conditioning system controlling method wherein whether an occupant is sitting on a seat is detected for each of the seats and air is blown out to only the seat on which the occupant sits. According to this method, it is possible to decrease the total volume of air blown out from the air conditioning system and thereby further diminish the load on the refrigerant compressor.

In a fourth aspect of the present invention there is provided an air conditioning system for a vehicle having three or more rows of seats in the longitudinal direction of the vehicle. The seats are adjustable in their vehicular longitudinal positions. The air conditioning system has a plurality of air outlets in the longitudinal direction of the vehicle and has a sitting position detecting means for detecting an occupant's sitting position in the longitudinal direction of the vehicle. An outlet selecting means is provided for selecting, out of the plural outlets, an outlet located near the occupant's sitting position based on the result of detection obtained by the sitting position detecting means, blow out direction calculating means which calculate a direction in which air is blown out from the outlet selected by the outlet selecting means. This is based on the detection obtained by the sitting position detecting means, and blow out direction adjusting means which are controlled based on the calculation obtained by the blow out direction calculating means and which adjust the blow out direction of air from the outlet selected by the outlet selecting means.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description. In the drawings:

BRIEF DESCRIPTION OF THE DRAWINGS

The present invention will become more fully understood from the detailed description and the accompanying drawings, wherein.

DETAILED DESCRIPTION OF PREFERRED EMBODIMENTS (First Embodiment)

Figure 1:
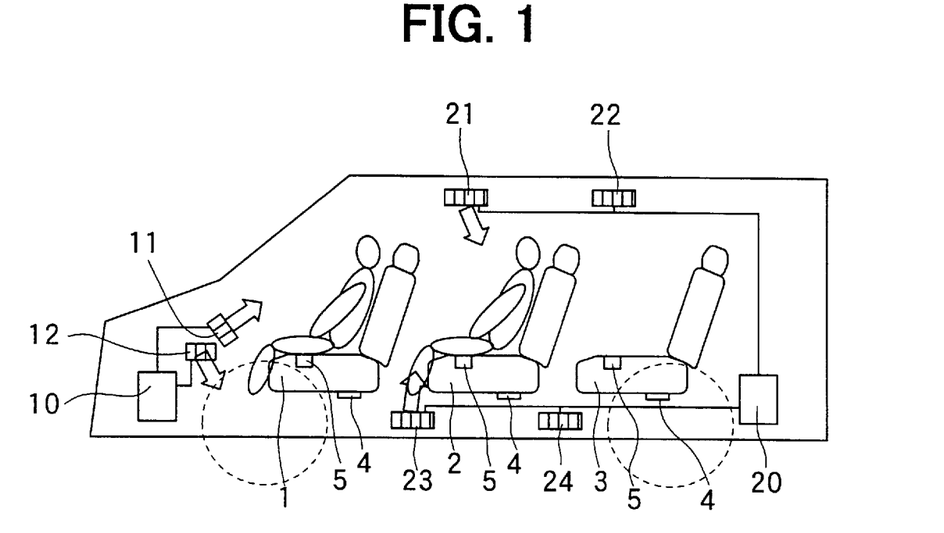
FIG. 1 is a schematic view of a vehicle having a vehicular air conditioning system according to a first embodiment of the present invention.

FIGS. 1 to 6 illustrate an air conditioning system for a vehicle according to a first embodiment of the present invention. In FIG. 1 which shows a mounting layout of the air conditioning system, a front seat 1, a middle seat 2 and a rear seat 3 are arranged in the vehicular compartment successively from the front to the rear side of the vehicle.

The seats 1 to 3 are each slidable in the longitudinal direction of the vehicle by means of a seat slide mechanism (not shown). A vehicular longitudinal position of each of the seats 1 to 3 is detected by means of a slide position sensor (sitting position detecting means) installed in the seat slide mechanism of each seat and a sitting position in the vehicular longitudinal direction of an occupant sitting on the seat is estimated based on the result of the detection. Further, a sitting sensor (sitting detecting means) 5 for detecting whether an occupant sits on a seat or not is disposed on the seat surface of each of the seats 1 to 3.

In the foremost portion in the interior of the vehicle compartment is disposed an instrument board (not shown) and in the interior of the instrument board is disposed a front seat air conditioning unit 10 for air-conditioning (cooling and heating) the space formed on the front seat 1 side. The front seat air conditioning unit 10 is provided with a front seat evaporator (not shown) as a heat exchanger for cooling, a front seat heater core (not shown) as a heat exchanger for heating, and a front seat blower (not shown).

The front seat blower blows out inside or outside air toward the front seat evaporator and the front seat heater core. The front seat evaporator is provided in a known refrigerating cycle including a refrigerant compressor which is driven by an engine, to cool blast air. Engine cooling water (warm water) flows through the interior of the heater core. The front seat heater core uses this warm water as a heat source to heat blast air.

On the other hand, a rear seat air conditioning unit 20 for air-conditioning (cooling and heating) spaced formed on the middle seat 2 and rear seat 3 sides is mounted in the space between a trim (inner wall of the vehicle compartment) and an outside plate of the vehicle. The rear seat air conditioning unit 20 is provided with a rear seat evaporator (not shown) as a heat exchanger for cooling, a rear seat heater core (not shown) as a heat exchanger for heating, and a rear seat blower (not shown).

The rear seat blower blows out inside air toward the rear seat evaporator and the rear seat heater core. Like the front seat cooler, the rear seat cooler is also provided in a refrigerating cycle to cool blast air. Like the front seat heater core, the rear seat heater core also allows engine cooling water (warm water) to flow therein and uses this warm water as a heat source to heat blast air.

In the instrument board is formed a front seat face outlet 11 to blow out air from the front seat air conditioning unit 10 toward the upper half of the front seat occupant, while in the underside of the instrument board is formed a front seat foot outlet 12 for blowing out air from the front seat air conditioning unit 10 toward the feet of the front occupant.

Proximate the vehicular ceiling are disposed a middle seat face outlet 21 for blowing out air from the rear seat air conditioning unit 20 mainly toward the upper half of the middle seat occupant and a rear seat face outlet 22 for blowing out air from the rear seat air conditioning unit 20 mainly to the upper half of the rear seat occupant. The middle seat face outlet 21 is located in the rear of the front seat 1 and the rear seat face outlet 22 is located in the rear of the middle seat.

In the vicinity of a floor surface of the vehicle are disposed a middle seat foot outlet 23 for blowing out air from the rear seat air conditioning unit 20 mainly toward the feet of the middle seat occupant and a rear seat foot outlet 24 for blowing out air from the rear seat air conditioning unit mainly toward the feet of the rear seat occupant. The middle seat foot outlet 23 is located at a position in the rear of the front seat 1 in the vehicle and the rear seat foot outlet 24 is located at a position still in the rear of the middle seat foot outlet 23.

Next, a description will be given below about a concrete configuration of the outlets 11, 12 and 21 to 24. An opening of each outlet comprises a first opening 30 and a second opening 40. In the first opening 30 are disposed a first vertical louver 32 which is driven by a first motor 31 and swings right and left in FIG. 2 and a first horizontal louver 34 which is driven by a second motor 33 and swings up and down in FIG. 2. The first vertical louver 32 is made up of three thin strips and a horizontal blow out direction in FIG. 2 of air from the first opening 30 can be adjusted by adjusting a stop position of the first vertical louver 32.

Figure 2:
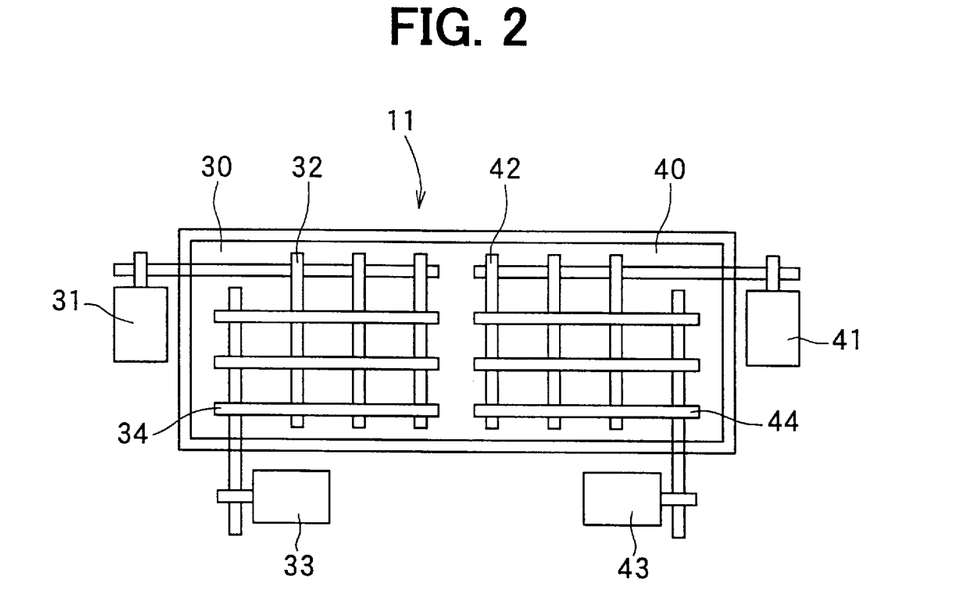
FIG. 2 is a plan view of an outlet shown in FIG. 1 according to the invention.

The first horizontal louver 34 is also made up of three thin strips and a vertical blow out direction in FIG. 2 of air from the first opening 30 can be adjusted by adjusting a stop position of the first horizontal louver 34. The first opening 30 can be fully closed by both first vertical and horizontal louvers 32, 34.

On the other hand, within the second opening 40 are disposed a second vertical louver 42 which is driven by a third motor 41 and swings right and left in FIG. 2 and a second horizontal louver 44 which is driven by a fourth motor 43 and swings up and down in FIG. 2. The second vertical louver 42 is composed of three thin strips and a horizontal blow out direction in FIG. 2 of air from the second opening 40 can be adjusted by adjusting a stop position of the second vertical louver 42.

The second horizontal louver 44 is composed of three thin strips and a vertical blow out direction in FIG. 2 of air from the second opening 40 can be adjusted by adjusting a stop position of the second horizontal louver 44. Further, the second opening 40 can be fully closed by both second vertical and horizontal louvers 42, 44.

Blow out direction adjusting means for adjusting in which direction air from the outlets 11, 12 and 21–24 is to be blown out, is constituted by the first to fourth motors 31, 33, 41, 43, the first and second vertical louvers 32, 42 and the first and second horizontal louvers 34, 44.

Figure 3:
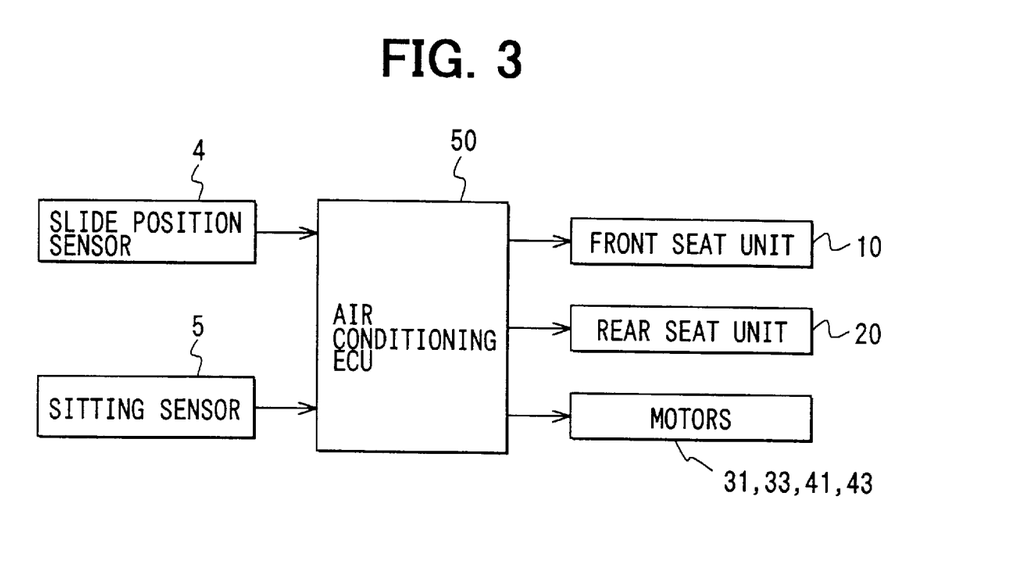
FIG. 3 is a block diagram of a control system used in the air conditioning system shown in FIG. 1.
Figure 4:
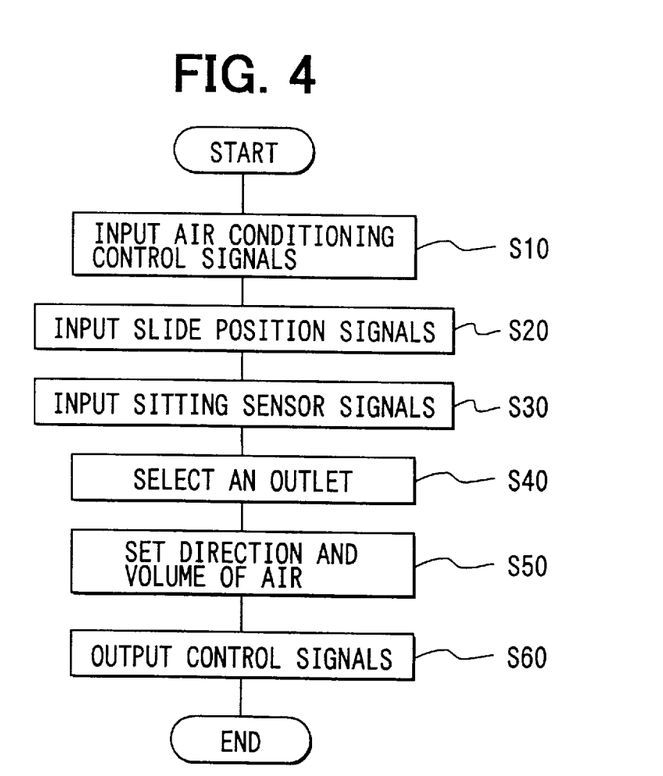
FIG. 4 is a flow chart showing an air conditioning control process executed by an ECU (electronic control unit) shown in FIG. 2.

FIG. 3 shows a configuration of a control system, in which an ECU (electronic control unit) 50 for air conditioning executes a program in accordance with a flow chart of FIG. 4 and performs arithmetic processings necessary for control. Signals provided from the slide position sensors 4 and the sitting sensors 5, as well as signals indicative of information necessary for air conditioning control (inside air temperature, outside air temperature, evaporator outlet temperature, temperature set for air conditioning), are input to the air conditioning ECU 50.

Based on calculation results, the ECU 50 controls devices (including a front seat blower driving motor, a motor for driving a blow out air temperature adjusting air mix damper, and a motor for driving an outlet switching damper) contained in the front seat air conditioning unit 10, devices (including a rear seat blower driving motor, a motor for driving a blow out air temperature adjusting air mix damper, and a motor for driving an outlet switching damper) contained in the rear seat air conditioning unit 20, and the first to fourth motors 31, 33, 41, 43.

The following description is now provided about the operation of the air conditioning system constructed as above. In FIG. 4, first in step S10, signals indicative of information necessary for basic air conditioning control is input, then in step S20, signals provided from the slide position sensors 4 are input, and further in step S30, signals from the sitting sensors 5 are input.

Next, in step S40 (outlet selecting means), a check is made to see if an occupant is sitting on the seat for each of the seats 1 to 3 based on the signals provided from the sitting sensors 5. Then, if there is an occupant on any of these seats, a sitting position of the occupant in the vehicular longitudinal direction is estimated in accordance with the signal provided from the associated slide position sensor 4. Then, an outlet closest to the occupant's sitting position is selected out of the outlets 11, 12 and 21 to 24, and a decision is made to blow out air from the selected outlet toward the occupant. Likewise, also for the other occupants, if any, an outlet closest to the occupant is selected.

Next, in step S50 (blow out direction calculating means), the direction and volume of air blown out from the outlet selected in step S40 are calculated in accordance with the signal provided from the associated slide position sensor 4 (the details of the calculation will be described later).

Then, in step S60, based on calculation results obtained in step S50, control signals are output to the devices contained in the front seat air conditioning unit 10, the devices contained in the rear seat air conditioning unit 20, an electromagnetic clutch, and the first to fourth motors 31, 33, 41, 43.

Next, the controls in the above steps S40 and S50 will be described for each of occupants' sitting conditions. If it is not clearly described whether the control being made is during cooling or during heating, it is to be understood that the control is being made in a cooling condition. (Occupants sitting on the front and middle seats)

If it is determined in accordance with signals provided from the sitting sensors 5 that there is no occupant on the rear seat and that there are occupants on the front and middle seats, sitting positions in the vehicular longitudinal direction of the occupants sitting on the front and middle seats 1, 2 are estimated based on signals provided from the slide position sensors 4 attached to both seats.

Then, the front seat face outlet 11 is selected as a blow out air outlet for the occupant on the front seat 1 and the first and second vertical louvers 32, 42 and the first and second horizontal louvers 34, 44 are actuated by the first to fourth motors 31, 33, 41, and 43 associated with the front face outlet 11 to adjust the direction of air so that the air blown out from the front face outlet 11 is directed toward the upper half of the occupant on the front seat 1. Further, an appropriate volume of air blown out from the front face outlet 11 is set according to the distance between the front face outlet 11 and the occupant on the front seat 1.

As shown in FIG. 1, when the middle seat 2 is positioned close to the front side of the vehicle, the middle seat face outlet 21 closest to the sitting position of the occupant on the middle seat 2 is selected as an air blow out outlet for the occupant on the middle seat 2. Then, the first and second vertical louvers 32, 42 and the first and second horizontal louvers 34, 44 are actuated by the first to fourth motors 31, 33, 41, and 43 associated with the middle seat face outlet 21 and the direction of air is adjusted so that the air blown out from the middle seat face outlet is directed toward the upper half of the occupant on the middle seat 2. Further, an appropriate volume of air to be blown out from the middle seat face outlet 21 is set according to the distance between the middle seat face outlet 21 and the occupant on the middle seat 2.

As to the rear seat, since no occupant sits thereon, the first and second vertical louvers 32, 42 and the first and second horizontal louvers 34, 44 are actuated by the first to fourth motors 31, 33, 41, and 43 associated with the rear seat face outlet 22 to fully close the rear seat face outlet 22 and thereby stop the blow out of air from the rear seat face outlet 22.

For heating, air is blown out for the occupant on the front seat 1 from the front seat foot outlet 12 and air is blown out toward the feet of the occupant on the middle seat 2 from the middle seat foot outlet 23 closest to the sitting position of the occupant on the middle seat 2 to fully close the rear seat foot outlet 24 for which it is not necessary to blow out air.

Figure 5:
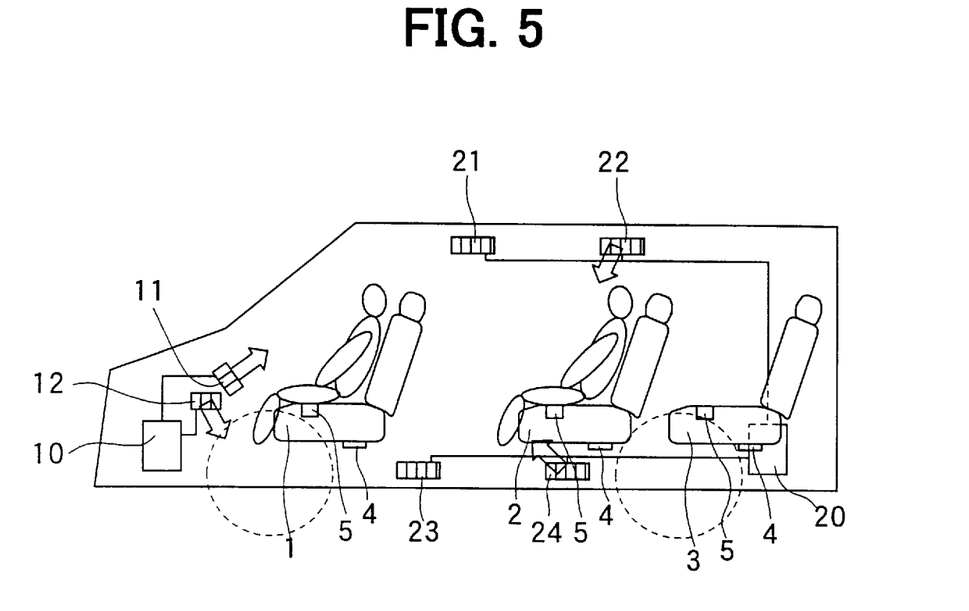
FIG. 5 is a schematic view of a vehicle having occupants' sitting state different from that shown in FIG. 1 and explaining the operation of the first embodiment.

On the other hand, when the middle seat 2 is positioned close to the rear side of the vehicle, as shown in FIG. 5, the rear seat face outlet 22 closest to the sitting position of the occupant on the middle seat 2 is selected as an air blow out outlet for the occupant on the middle seat 2. Then, the first and second vertical louvers 32, 42 and the first and second horizontal louvers 34, 44 are actuated by the first to fourth motors 31, 33, 41, and 43 associated with the rear seat face outlet 22 thus selected to adjust the direction of air so that air is blown out from the rear seat face outlet 22 toward the upper half of the occupant on the middle seat 2. Further, an appropriate volume of air to be blown out from the rear seat face outlet 22 is set according to the distance between the rear seat face outlet and the occupant on the middle seat 2.

For the occupant on the front seat 1 air is blown out from the front seat face outlet 11, and for the occupant on the middle seat 2 air is blown out from the rear seat face outlet 22. Therefore, the middle seat face outlet 21 is fully closed to stop the blow out of air from the middle seat face outlet 21.

For heating, air is blown out for the occupant on the front seat 1 from the front seat foot outlet 12 and air is blown out toward the feet of the occupant on the middle seat 2 from the rear seat foot outlet 24 closest to the sitting position of the occupant on the middle seat 2, while the middle seat foot outlet 23, from which it is not necessary to blow out air, is fully closed.

(Occupants Sitting on the Front and Rear Seats)

When it is determined in accordance with signals provided from the sitting sensors 5 that there are occupants on the front and rear seats, with no occupant on the middle seat, sitting positions in the vehicular longitudinal direction of the occupants on the front and rear seats 1, 3 are estimated based on signals provided from the slide position sensors 4 associated with the front and rear seats.

Then, air is blown out from the front seat face outlet 11 toward the occupant on the front seat 1. At this time, the direction of air is adjusted so that air is blown out toward the upper half of the occupant on the front seat 1 from the front seat face outlet 11, and an appropriate volume of air to be blown out from the front face outlet 11 is set according to the distance between the front seat face outlet 11 and the occupant on the front seat 1.

When the rear seat 3 is positioned close to the rear side of the vehicle, the rear seat face outlet 22 closest to the sitting position of the occupant on the rear seat 3 is selected and the direction of air is adjusted so that air is blown out from the rear seat face outlet toward the upper half of the occupant on the rear seat 3. Further, an appropriate volume of air to be blown out from the rear seat face outlet 22 is set according to the distance between the rear seat face outlet 22 and the occupant on the rear seat 3.

As to the middle seat, since there is no occupant thereon, the middle face outlet 21 is fully closed to stop the blow out of air from the middle seat face outlet 21. For heating, air is blown out for the occupant on the front seat 1 from the front seat foot outlet 12 and air is blown out toward the feet of the occupant on the rear seat 3 from the rear seat foot outlet 24 closest to the sitting position of the occupant on the rear seat 3, while the middle seat foot outlet 23, from which it is not necessary to blow out air, is fully closed.

On the other hand, where the middle seat 2 is folded for example and the rear seat 3 is moved to the front side of the vehicle up to near the position of the middle seat 2 in FIG. 1, the middle seat face outlet 21 closest to the sitting position of the occupant on the rear seat 3 is selected as an air blow out outlet for the occupant on the rear seat 3 and the direction of air is adjusted so that air is blown out from the middle face outlet 21 toward the upper half of the occupant on the rear seat 3. Further, an appropriate volume of air to be blown out from the middle seat face outlet 21 is set according to the distance between the middle seat face outlet 21 and the occupant on the rear seat 3.

For heating, air is blown out for the occupant on the front seat 1 from the front seat foot outlet 12 and air is blown out toward the feet of the occupant on the rear seat 3 from the middle seat foot outlet 23 closest to the sitting position of the occupant on the rear seat 3, while the rear foot outlet 24, from which it is not necessary to blow out air, is fully closed.

(Occupant on only the Front Seat)

If it is determined in accordance with signals provided from the sitting sensors 5 that there is an occupant on only the front seat, with no occupant on the middle and rear seats, air is blown out for the occupant on the front seat 1 from the front seat face outlet 11. At this time, the direction of air is adjusted so that air is blown out from the front seat face outlet 11 toward the upper half of the occupant on the front seat 1, and an appropriate volume of air is set according to the distance between the front seat face outlet 11 and the occupant on the front seat 1.

Since there is no occupant on the middle and rear seats, the rear seat blower in the rear seat air conditioning unit 20 is turned OFF to stop the blow out of air from the middle and rear seat face outlets 21, 22.

For heating, air is blown out for the occupant on the front seat 1 from the front seat foot outlet 12, while the rear seat blower in the rear seat air conditioning unit 20 is turned OFF.

(Occupant on Only the Middle Seat)

When there is an occupant on only the middle seat, with no occupant on the front and rear seats, for example during parking, a sitting position in the vehicular longitudinal direction of the occupant sitting on the middle seat 2 is estimated based on a signal provided from the slide position sensor 4 associated with the middle seat 2.

Then, air is blown out for the occupant on the middle seat 2 from a face outlet (either the middle seat face outlet 21 or the rear seat face outlet 22 in this embodiment) closest to the sitting position of the occupant on the middle seat 2. At this time, the direction of air is adjusted so that air is blown out from the face outlet toward the upper half of the occupant on the middle seat 2. Further, an appropriate volume of air to be blown out is set according to the distance between the face outlet in question and the occupant on the middle seat 2.

On the other hand, of the middle and rear seat face outlets 21, 22, the one not used for blowing out air to the occupant on the middle seat 2 is fully closed. Further, the front seat blower in the front seat air conditioning unit 10 is turned OFF to stop the blow out of air from the front seat face outlet 11.

For heating, air is blown out toward the feet of the occupant on the middle seat 2 from the foot outlet closer to the sitting position of the occupant on the middle seat 2 out of the middle and rear seat foot outlets 23, 24, while the outlet not used for the blow out of air to the occupant on the middle seat 2 is fully closed. Further, the blower in the front seat air conditioning unit 10 is turned OFF to stop the blow out of air from the front seat foot outlet 12.

(Occupant on only the Rear Seat)

When there is an occupant on only the rear seat, with no occupant on the front and middle seats, during parking for example, a sitting position in the vehicular longitudinal direction of the occupant sitting on the rear seat 3 is estimated based on a signal provided from the slide position sensor 4 associated with the rear seat 3.

Then, for the occupant on the rear seat 3 air is blown out from a face outlet (either the middle seat face outlet 21 or the rear seat face outlet 22 in this embodiment) closest to the sitting position of the occupant on the rear seat 3. At this time, the direction of air is adjusted so that air is blown out from that face outlet toward the upper half of the occupant on the rear seat 3, and an appropriate volume of air to be blown out is set according to the distance between that face outlet and the occupant on the rear seat 3.

Further, of the middle and rear seat face outlets 21, 22, the one not used for the blow out of air for the occupant on the rear seat 3 is fully closed. The front seat blower in the front seat air conditioning unit 10 is turned OFF to stop the blow out of air from the front seat face outlet 11.

For heating, air is blown out toward the feet of the occupant on the rear seat 3 from the foot outlet closer to the sitting position of the occupant on the rear seat 3 out of the middle and rear foot outlets 23, 24, while the outlet not used for the blow out of air to the occupant on the rear seat 3 is fully closed. Further, the front seat blower in the front seat air conditioning unit 10 is turned OFF to stop the blow out of air from the front seat foot outlet 12.

(Occupants on all of the Front, Middle and Rear Seats)

If it is determined in accordance with signals provided from the sitting sensors 5 that there are occupants on all of the front, middle and rear seats, sitting positions of the occupants in the vehicular longitudinal direction of the occupants on the front, middle and rear seats 1, 2, 3 are estimated based on signals from the slide position sensors 4 associated with the front, middle and rear seats, respectively.

Then, air is blown out for the occupant on the front seat 1 from the front seat face outlet 11. At this time, the direction of air is adjusted so that air is blown out from the front seat face outlet 11 toward the upper half of the occupant on the front seat 1, and an appropriate volume of air to be blown out from the front seat face outlet 11 is set according to the distance between the front seat face outlet 11 and the occupant on the front seat 1.

In the case where the middle seat 2 is positioned close to the vehicular front side, the middle seat outlet 21 closest to the sitting position of the occupant on the middle seat 2 is selected and the direction of air is adjusted so that air is blown out from the middle face outlet 21 toward the upper half of the occupant on the middle seat 2. Further, an appropriate volume of air to be blown out from the middle face outlet 21 is determined according to the distance between the middle seat face outlet 21 and the occupant on the middle seat 2.

Where the rear seat 3 is positioned close to the rear side of the vehicle, the rear seat face outlet 22 closest to the sitting position of the occupant on the rear seat 3 is selected as an air blow out outlet for the occupant on the rear seat and the direction of air is adjusted so that air is blown out from the rear seat face outlet 22 thus selected toward the upper half of the occupant on the rear seat 3. Further, an appropriate volume of air to be blown out from the rear face outlet 22 is determined according to the distance between the rear seat face outlet 22 and the occupant on the rear seat 3.

Figure 6:
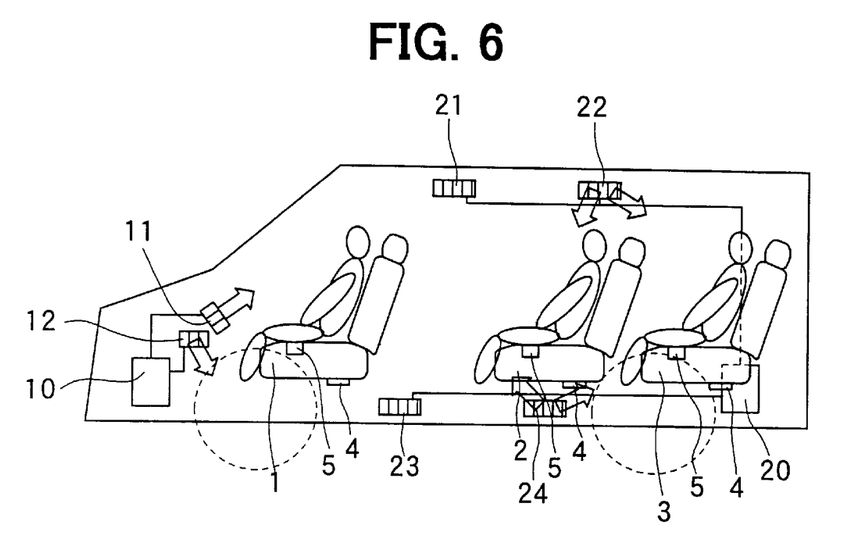
FIG. 6 is a schematic view of the vehicle showing an occupants' sitting state and explaining the operation of the first embodiment.

On the other hand, as shown in FIG. 6, when the middle seat 2 is positioned close to the rear side of the vehicle, the rear seat face outlet 22 closest to the sitting position of the occupant on the middle seat 2 is selected as an air blow out outlet for the occupant on the middle seat.

Then, the first and second vertical louvers 32, 42 and the first and second horizontal louvers 34, 44 are actuated by the first to fourth motors 31, 33, 41, and 43 associated with the rear seat face outlet 22, and the direction of air is adjusted so that air is blown out from the first opening 30 of the rear seat face outlet 22 toward the upper half of the occupant on the middle seat 2. Likewise, the direction of air is adjusted so that air is blown out from the second opening 40 of the rear seat face outlet 22 toward the upper half of the occupant on the rear seat 3.

Moreover, an appropriate volume of air to be blown out from the rear face outlet 22 is determined according to the distances between the rear seat face outlet 22 and the occupants on the middle and rear seats 2, 3 and in consideration of the point that air is blown out from a common outlet for the occupants on the middle and rear seats 2, 3.

Further, since air is blown out for the occupant on the middle seat 2 from the rear seat face outlet 22, the middle seat face outlet 21 is fully closed to stop the blow out of air from the middle face outlet 21.

For heating, the rear seat foot outlet 24 closest to the sitting position of the occupant on the middle seat 2 is selected as an air blow out outlet for the occupant on the middle seat 2, and the direction of air is adjusted so that air is blown out toward the feet of the occupant on the middle seat 2 from the first opening 30 of the rear seat foot outlet 24. Likewise, the direction of air is adjusted so that air is blown out from the second opening 40 of the rear seat foot outlet 24 toward the feet of the occupant on the rear seat 3.

Further, for the occupant on the front seat 1 air is blown out from the front seat foot outlet 12, while the middle seat foot outlet 23, from which it is not necessary to blow out air, is fully closed.

(Occupants on the Middle and Rear Seats)

When occupants sit on the middle and rear seats, with no occupant on the front seat, during parking for example, the front seat blower in the front seat air conditioning unit 10 is turned OFF to stop the blow out of air from the front seat foot outlet 12.

As to the blow out of air to the middle and rear seats, control is made in the same manner as is the case with occupants sitting on the front, middle and rear seats. According to this embodiment described above, a sitting position in the vehicular longitudinal direction of an occupant is detected, then an outlet close to the sitting position of the occupant is selected and air is blown out from the outlet thus selected, so that it becomes easier for air to reach the occupant and with a reduced volume of blown out air it is possible to sufficiently cool and warm the occupant.

Also, since the volume of air blown out to an occupant can be reduced, no draft air flows toward another occupant.

Moreover, since the volume of air blown out toward an occupant can be reduced, it is possible to diminish the load on the refrigerant compressor during cooling and hence possible to diminish the driving force of the refrigerant compressor. Further, since air is not blown out from an outlet which is not used for air conditioning, it is possible to reduce the entire volume of blow out air and further diminish the load on the refrigerant compressor.

Further, since the volume of air blown out toward an occupant can be reduced, it is possible to prevent the air temperature from dropping during heating and sufficiently warm the occupant. Further, since air is not blown out from an outlet not used for air conditioning, the entire volume of blow out air is reduced and a drop in temperature of blown out air during heating is prevented.

(Second Embodiment)

Figure 7:
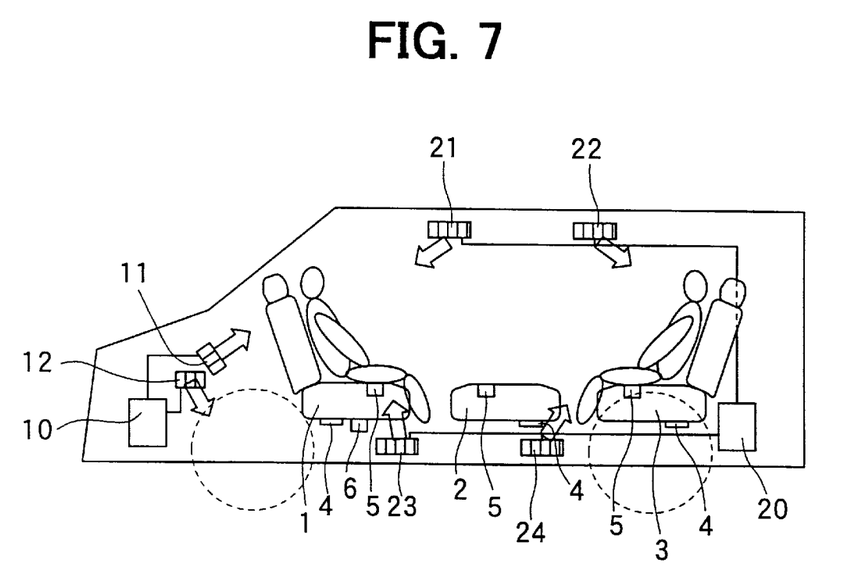
FIG. 7 is a side view of a vehicle carrying thereon a vehicular air conditioning system according to a second embodiment of the present invention.

FIG. 7 illustrates a second embodiment of the present invention, in which the air conditioning system of the present invention is applied to a vehicle having a rotatable front seat 1. This second embodiment is different from the first embodiment in that the front seat 1 is rotatable and that a rotational position sensor 6 is used for detecting a rotational position (seat direction) of the front seat 1.

FIG. 7 shows a state in which, during parking, the front seat 1 is turned backward and occupants sit on the front seat 1 and rear seat 3. In this case, the front seat 1 facing backward is detected by the rotational position sensor 6, so that, for cooling, air is blown out for the occupant on the front seat 1 from the middle seat face outlet 21. At this time, direction of air adjusted so that air is blown out from the middle seat face outlet 21 toward the upper half of the occupant on the front seat 1, and an appropriate volume of air to be blown out from the middle seat face outlet 21 is determined according to the distance between the middle seat face outlet 21 and the occupant on the front seat 1.

Further, during cooling, the rear seat face outlet 22 closest to the sitting position of the occupant on the rear seat 3 is selected as a blow out air outlet for the occupant on the rear seat 3 and the direction of air is adjusted so that air is blown out from the rear seat face outlet 22 thus selected toward the upper part of the occupant on the rear seat 3. Also, an appropriate volume of air to be blown out from the rear seat face outlet 22 is determined according to the distance between the rear seat face outlet 22 and the occupant on the rear seat 3.

Further, the front seat blower in the front seat air conditioning unit 10 is turned OFF to stop the blow out of air from the front seat face outlet 11. For heating, air is blown out from the middle seat foot outlet 23 toward the feet of the occupant on the front seat 1 and likewise air is blown out from the rear seat foot outlet 24 toward the feet of the occupant on the rear seat 3. Further, the front seat blower in the front seat air conditioning unit 10 is turned OFF to stop the blow out of air from the front seat foot outlet 12.

When the front seat 1 faces upward, there is the same air conditioning control as in the first embodiment.

MODIFICATIONS

In the above embodiments, a sitting sensor was used as a sitting detecting means for detecting whether an occupant sits on a seat or not. However, this detection can be effected also with the use of an infrared sensor or a seat belt switch. Even without using such sitting detecting means, whether occupants sit on the middle and rear seats 2, 3 can be estimated based on signals from the slide position sensors attached to the middle and rear seats, respectively. For example, when the middle seat 2 is set at a vehicular front position to such an extent as eliminates the space for occupant's feet at the middle seat, it is presumed that no occupant sits on the middle seat. Likewise, when the middle and rear seats 2, 3 are so close to each other as leaving no space for occupant's feet at the rear seat 3, it is presumed that no occupant sits on the rear seat.

Although in the above embodiments each outlet is closed with louvers to stop the blow out air, a door may be provided within a duct for conducting air from an air conditioning unit to the outlet and the outlet may be closed with the door to stop the blow out of air. Further, a grill provided in each outlet may be inverted to close the opening and thereby stop the blow out of air.

Although in the above embodiments the volume of air to be blown out is controlled according to the distance between each outlet and an occupant, the temperature or velocity of blown out air may be controlled. In this case, for cooling, the temperature of blown out air is lowered or the velocity thereof is increased as the outlet-occupant distance increases, whereby the occupant can be given a sufficient cool feeling with a reduced volume of blown out air.

Further, by detecting a rotational quantity of a seat, the level of the seat surface, and the degree of inclination of the seat back, and by using the results of the detection in combination with the result of detection provided from the slide position sensor 4 attached to the seat, it is possible to estimate sitting position and posture of the occupant on the seat more accurately.

While the above-described embodiments refer to examples of usage of the present invention, it is understood that the present invention may be applied to other usage, modifications and variations of the same, and is not limited to the disclosure provided herein.

What is claimed is:

1. A method for controlling an air conditioning system for a vehicle having three or more rows of seats in a vehicular longitudinal direction, the air conditioning system being provided within a vehicular compartment and having a plurality of air outlets arranged toward each seat of the three or more rows of seats in the vehicular longitudinal direction, at least one of the seats being position adjustable in the vehicular longitudinal direction from a nearest position with respect to one air outlet and to another nearest position with respect to another air outlet, the method comprising:

detecting a seat position of the position adjustable seat, in the vehicular longitudinal direction;

selecting an outlet located near the seat position from the plurality of outlets based on the detected seat position; and blowing out air from the selected outlet toward the seat position.

2. The method of claim 1, wherein the temperature or volume of air blown out from the plurality of outlets is controlled according to the seat position.

3. The method of claim 1, wherein an occupant sitting on a seat is detected for each of the seats and air is blown out to only a seat of said seats on which the occupant sits.

4. An air conditioning system for a vehicle having three or more rows of seats in a vehicular longitudinal direction, the air conditioning system being provided within a vehicular compartment and having a plurality of air outlets arranged to each seat of the three or more rows of seats in the vehicular longitudinal direction, at least one of the seats being position adjustable in the vehicular longitudinal direction from a nearest position with respect to one air outlet and to another nearest position with respect to another air outlet, the system comprising:

seat position detecting means for detecting a position of the position adjustable seat in the vehicular longitudinal direction;

outlet selecting means for selecting from the plurality of outlets an outlet located nearest to the seat position based on the detected seat position obtained by the seat position detecting means;

blow out direction calculating means which calculates a direction that air is to be blown out from the outlet selected by the outlet selecting means based on the detection obtained by the seat position detecting means; and blow out direction adjusting means which are controlled based on the calculation obtained by the blow out direction calculating means and which adjusts a blow out direction of air from the outlet selected by the outlet selecting means.

5. An air conditioning system for a vehicle according to claim 4 further comprising:

a slide position sensor in a seat slide mechanism of each seat which detects the seat position of the position adjustable seat in the vehicular longitudinal direction.

6. A method for controlling an interior air conditioning system for a vehicle comprising:

detecting a first location of a seat, of a plurality of seats, relative to a front or rear location of the vehicle;

selecting a first air conditioning outlet from a plurality of outlets when the first air conditioning outlet is the closest to the first location of the seat;

directing the first air conditioning outlet toward an occupant in the first location of the seat, wherein the first air conditioning outlet discharges a volume of air;

detecting a second location of the seat relative to the front or rear location of the vehicle;

selecting a second air conditioning outlet from the plurality of outlets when the second air conditioning outlet is the closest to the second location of the seat; and directing the second air conditioning outlet toward an occupant in the second location of the seat.

7. A method for controlling an interior air conditioning system for a vehicle according to claim 6, wherein the second air conditioning outlet is the same outlet as the first air conditioning outlet when the first air conditioning outlet is the closest to the second location of the seat.

8. A method for controlling an interior air conditioning system for a vehicle according to claim 6, wherein an occupant sitting on a seat is detected for each of the seats and air is discharged to only the seat on which the occupant sits.

9. A method for controlling an interior air conditioning system for a vehicle according to claim 6, wherein the volume of the air directed at the occupant is based upon an interior temperature of the vehicle.

* * * * *